US008623950B2

(12) United States Patent
Shin et al.

(10) Patent No.: US 8,623,950 B2
(45) Date of Patent: Jan. 7, 2014

(54) HIGH HEAT AND CHLORINE RESISTANT POLYURETHANEUREA ELASTIC FIBER AND PREPARATION OF THEREOF

(75) Inventors: Ickgy Shin, Busan (KR); Inrak Jung, Ulsan (KR); Haedong Kim, Ulsan (KR)

(73) Assignee: Tae Kwang Ind. Co., Ltd., Seoul (KR)

( * ) Notice: Subject to any disclaimer, the term of this patent is extended or adjusted under 35 U.S.C. 154(b) by 323 days.

(21) Appl. No.: 12/999,198

(22) PCT Filed: Dec. 1, 2008

(86) PCT No.: PCT/KR2008/007079
§ 371 (c)(1),
(2), (4) Date: Dec. 15, 2010

(87) PCT Pub. No.: WO2010/050639
PCT Pub. Date: May 6, 2010

(65) Prior Publication Data
US 2011/0092628 A1      Apr. 21, 2011

(30) Foreign Application Priority Data

Oct. 28, 2008   (KR) .......................... 10-2008-0105972

(51) Int. Cl.
B28B 11/18     (2006.01)
B29C 47/00     (2006.01)
B29C 47/12     (2006.01)
D01F 6/00      (2006.01)
C08G 18/00     (2006.01)
C08G 18/08     (2006.01)
C08G 18/10     (2006.01)
C08G 18/28     (2006.01)
C08G 18/30     (2006.01)
C08G 18/32     (2006.01)
C08K 3/00      (2006.01)
C08K 3/26      (2006.01)
C08L 75/00     (2006.01)

(52) U.S. Cl.
USPC . 524/424; 264/165; 264/172.17; 264/177.13; 264/177.2; 264/205; 524/589; 524/590; 528/44; 528/60; 528/61

(58) Field of Classification Search
USPC ........... 264/165, 172.17, 177.13, 177.2, 205; 524/424, 589, 590; 528/44, 60, 61
See application file for complete search history.

(56) References Cited

U.S. PATENT DOCUMENTS

| 4,340,527 | A  | 7/1982 | Martin      |
| 5,100,999 | A  | 3/1992 | Muari et al.|
| 5,626,960 | A  | 5/1997 | Carney      |
| 6,545,074 | B1 | 4/2003 | Kwon et al. |

FOREIGN PATENT DOCUMENTS

| CN | 1344337       | A  |   | 4/2002  |
| CN | 1396320       | A  |   | 2/2003  |
| CN | 1621585       | A  |   | 6/2005  |
| CN | 101126181     | A  |   | 2/2008  |
| CN | 101139460     | A  |   | 3/2008  |
| CN | 101139751     | A  |   | 3/2008  |
| GB | 2080349       | A  |   | 6/1980  |
| JP | 4422113       |    |   | 9/1969  |
| JP | S5729609      | A  |   | 2/1982  |
| JP | 58059213      | A  |   | 8/1983  |
| JP | 59133248      | A  |   | 7/1984  |
| JP | 01110520      | A  |   | 4/1989  |
| KR | 1020040032322 | B1 |   | 9/2005  |
| KR | 100580324     | B1 |   | 5/2006  |
| KR | 100780395     | B1 |   | 11/2007 |
| KR | 100780602     | B1 |   | 11/2007 |
| WO | 2008004549    | A1 |   | 1/2008  |
| WO | 2008007879    | A1 |   | 1/2008  |
| WO | WO 2008/029997 |   | * | 3/2008  |

* cited by examiner

Primary Examiner — Patrick Niland
(74) Attorney, Agent, or Firm — The Webb Law Firm

(57) ABSTRACT

The present invention relates to a preparation method of polyurethaneurea elastic fiber, particularly a preparation method of high heat-resistant elastic fiber which retains unique physical properties of elastic fiber under the high temperature process. The polyurethaneurea elastic fiber of the present invention is characteristically prepared without using 1 functional mono-alcohol generally used to regulate the reaction speed and side-reaction during the prepolymer reaction to produce elastic fiber having excellent heat-resistance particularly for the dyeing processing or re-dyeing of polyester but using ethylenediamine alone as a chain extender for the polymerization. To reduce gel formation in polymer after the secondary polymerization and to regulate change of viscosity in the course of process, the ratio of the chain extender amine to the terminal group of prepolymer of the first polymerization is increased.

18 Claims, No Drawings

HIGH HEAT AND CHLORINE RESISTANT POLYURETHANEUREA ELASTIC FIBER AND PREPARATION OF THEREOF

TECHNICAL FIELD

The present invention relates to a preparation method of polyurethaneurea elastic fiber which has excellent heat-resistance and chlorine-resistance, suggesting that it is durable in chlorine water of swimming pool, and has excellent heat-resistance and provides high fabric quality facilitating re-dyeing and third-dyeing at high temperature process (at least 190° C.) by combined-weaving of nylon or polyester. The present invention relates to polyurethaneurea elastic fiber, more precisely polyurethaneurea elastic fiber having excellent heat-resistance and chlorine-resistance as well as viscosity stability and improved spinning properties and a preparation method of the same by continuous polymerization.

BACKGROUND ART

Polyurethaneurea elastic fiber is prepared by dry-spinning a polymer obtained by extending prepolymer of isocyanate terminal synthesized by high-molecular polyol and organic diisocyanate using diamine as chain extender, which is cross-knitted with nylon, polyester and natural fiber to be used as an elastic raw material applied in the production of clothes including foundation, socks, panty stocking, and swim suit.

In the structure of polyurethaneurea elastic fiber, hard segments composed of bulky urea groups are linked by hydrogen bond, providing excellent elasticity. But, under the high heat condition, hard segments move out of their places, causing damage on thermo-stability. Thus, when it is cross-knitted with synthetic fiber, which is a high temperature dyeing process, or re-stained or third-dyed for color combination to produce foundation, etc, the elastic fiber of fabric is easily loosed or cut and reducing elasticity of fabric and widened fabric size. This has been a common problem of polyurethaneurea elastic fiber.

Various attempts to improve heat-resistance have been made by polyurethaneurea elastic fiber production companies. Some of them produce fibers with improved heat-resistance, but as heat-resistance improved, other physical properties such as strength, elasticity recovery property, settability, and elasticity were sacrificed or problems in production line have been reported.

If ethylenediamine is independently used as a chain extender for the production of polyurethaneurea to increase elasticity and thermo-stability to commercially satisfactory level during dyeing process of synthetic fiber or re-dyeing or third-dyeing, heat-resistance is satisfactorily increased owing to the linearity of ethylenediamine and strong cohesive force between hard segments. But, the reaction speed of chain extension becomes so fast that side reactions are induced. In addition, such strong cohesive force induces gel generation, suggesting that viscosity of spinning solution becomes unstable, which might cause rapid increase of viscosity that makes spinning difficult or reduces strength and elasticity of elastic fiber.

As an effort to overcome the above problems, Japanese Patent Publication No. S44-22113 describes that a small amount of 1-functional mono-alcohol is used for the production of prepolymer to regulate the reaction speed of chain extension and to inhibit side reactions. But, instead, physical properties of elastic fiber such as strength and elasticity are necessarily sacrificed, which still needs improvement.

The examples of the prior arts for the improvement of heat-resistance of polyurethaneurea elastic fiber are described in Japanese Patent Publication No. S58-59213, and U.S. Pat. No. 5,100,999. According to those descriptions, polycaprolactonediol and polycarbonatediol are used as polyols composing soft segments of polyurethaneurea to give the structure of crystalline cross-linking point stronger to improve heat-resistance. However, the improvement effect was not so great and rather elasticity recovering property was lowered than that of polyurethaneurea using polyetherpolyol.

Japanese Patent Publication No. H1-110520 describes a method to improve heat-resistance by using diaminodiphenylurea as the diamine used as a chain extender. Precisely, in this invention, it was attempted to increase cross-linking density in hard segments of urea group included in the structure of diamine in order to increase heat-resistance. However, cross-linking was induced in pre-spinning polymer solution, resulting in time course changes of viscosity of the spinning solution with reducing stability.

In the meantime, Japanese Patent Publication H4-100919 describes a prior art for improving heat-resistance by using triamine as an additive added after polymerization but before spinning. Since then, many polyurethaneurea elastic fiber production companies tried to improve heat-resistance by using triamine as a chain extender or an additive but the results were not satisfactory. And thus, triamine is used only as a supplement for strength reduced by a co-extender added to improve heat settability. But, viscosity instability of spinning solution is unavoidable by using over-dose of triamine.

Polyurethaneurea elastic fiber is prepared by dry-spinning or melt-spinning a polymer obtained by extending prepolymer of isocyanate terminal synthesized by high-molecular polyol and organic diisocyanate using diamine chain, which is cross-knitted with nylon, polyester and natural fiber to be used as an elastic raw material applied in the production of clothes including foundation, socks, panty stocking, and swim suit.

The polyetherglycol structure composing the soft segments of polymer of polyurethaneurea elastic fiber becomes degraded by chlorine water used for bleaching or active chlorine used for sterilization of swimming pool, resulting in the decrease of physical properties. To improve chlorine-resistance of polyurethaneurea elastic fiber used for swim suit, it has been tried to produce polyurethane elastic fiber using polyesterglycol. However, aliphatic ester is easily attacked by fungi because of its high biological activity and chlorine-resistance thereof is not so good. To improve chlorine-resistance of polyether based polyurethane, diverse chlorine-resistant additives have been tried. Japanese Patent No. S57-29609 and U.S. Pat. No. 4,340,527 describe the use of zinc oxide for the improvement of chlorine-resistance. But, zinc oxide has a problem of being yellow by the reaction with an additive and being eluted during acidic staining (pH 3-4). In particular, the use of zinc component is prohibited by European environment regulations. Japanese Patent No. S59-133248 describes that chlorine-resistance is improved by using hydrotalcite. However, hydrotalcite used as an additive to improve chlorine-resistance is very hygroscopic, so that gel formation and filtering pressure are increased and spinning property is decreased. Japanese Patent No. H91-243446 describes that chlorine-resistance of polyurethaneurea elastic fiber is improved by using hydrotalcite coated with fatty acid to prevent moisture absorption of the anti-chlorine additive and to improve dispersibility. However, hydrotalcite is reacted with an additive added to increase light-resistance and gas-resistance of the fiber, so that the product becomes yellow during spinning and wave is made in the fiber. U.S. Pat. No. 5,626,960 describes the use of huntite-hydromagnesite mixture to improve chlorine-resistance. However, gel formation in polymer resulted from absorption of the anti-chlorine material not coated and poor dispersibility are still problems with this method along with the increase of filtering pressure and the decrease of spinnability, resulting in the color change of the final product to yellow.

DISCLOSURE

Technical Problem

It is an object of the present invention to provide polyether based polyurethaneurea elastic fiber having excellent heat-resistance and chlorine-resistance.

It is another object of the present invention to provide an additive composition having excellent compatibility with an additive added to prevent oxidation of polyurethane elastic fiber and to improve light-resistance and waste gas-resistance, an anti-chlorine additive and polyurethaneurea.

It is also an object of the present invention to provide polyurethaneurea elastic fiber having excellent chlorine-resistance, elasticity recovering property, strength retaining property and heat-resistance by using basic magnesium carbonate as an anti-chlorine additive.

It is further an object of the present invention to provide a preparation method of polyurethaneurea elastic fiber having excellent heat-resistance and high fabric quality facilitating re-dyeing and third staining under high temperature post-process condition (at least 190° C.) by combined-weaving with nylon or polyester.

Technical Solution

To achieve the above objects, the present invention provides a preparation method of polyurethaneurea elastic fiber comprising the following steps:

(a) preparing the $1^{st}$ polyurethane polymer by mixing polyol and isocyanate compound;

(b) preparing the $2^{nd}$ polymer by adding a chain extender, a chain terminator, and a cross-linking agent to the $1^{st}$ polymer of step (a);

(c) preparing spinning dope by adding basic magnesium carbonate as an anti-chlorine additive to the $2^{nd}$ polymer of step (b); and (d) preparing elastic fiber by spinning the spinning dope of step (c).

Particularly, the present invention relates to a preparation method of polyurethaneurea elastic fiber having improved heat-resistance and chlorine-resistance comprising the following steps:

(a) preparing the $1^{st}$ polyurethane polymer by mixing polyol and isocyanate compound in the absence of mono-alcohol;

(b) preparing the $2^{nd}$ polymer by adding a chain extender, a chain terminator, and a cross-linking agent to the $1^{st}$ polymer of step (a), in which ethylenediamine is used alone as a chain extender;

(c) preparing spinning dope by adding surface-modified basic magnesium carbonate as an anti-chlorine additive to the $2^{nd}$ polymer of step (b); and (d) preparing elastic fiber by spinning the spinning dope of step (c).

More particularly, the present invention relates to a preparation method of polyurethaneurea elastic fiber having improved chlorine-resistance comprising the following steps:

(a) preparing the $1^{st}$ polymer having 2.4-3.5 mol % of non-reacted diisocyanate at terminal and having 500-700 poise of viscosity by mixing 3-20 ppm of organic acid to polytetramethyleneetherglycol component and then adding diphenylmethane-4,4'-diisocyanate at the concentration that makes equivalent (NCO/OH) to polytetramethyleneetherglycol 1.5-2.0;

(b) preparing the $2^{nd}$ polymer having 1000-2500 poise of apparent viscosity at 40° C. with solid content of 35% by adding a chain extender, a chain terminator, and a cross-linking agent to the $1^{st}$ polymer of step (a) with stirring;

(c) preparing spinning dope having 3500-7000 poise of viscosity (40° C., 35% solid content) by adding 0.1-10 weight % of basic magnesium carbonate coated with one or more coating agents selected from the group consisting of fatty acid, fatty acid metal salt, fatty acid ester, fatty acid phosphoester, silica, silane, polyorganosiloxan and polyorganosiloxan/polyorganohydrogensiloxan mixture, as an anti-chlorine additive, to the $2^{nd}$ polymer of step (b); and (d) preparing elastic fiber by spinning the spinning dope of step (c).

The method of the present invention can additionally include a step of preparing the $1^{st}$ polymer mixture in which non-diisocyanate content is coordinated by dissolving the $1^{st}$ polymer in N,N-dimethylacetamide.

In step (c), one or more additive compositions selected from the group consisting of titanium dioxide, 1,1,1',1'-tetramethyl-4,4'(methylene-di-p-phenylene)disemicarbazide, magnesium stearate, diethylenetriamine, dyeing property enhancer, and antioxidant can additionally be used. At this time, the content of such an additive composition in the whole dope is as follows: titanium dioxide 0.05-4.5 weight %, 1,1,1',1'-tetramethyl-4,4'(methylene-di-p-phenylene)disemicarbazide 0.2-3.5 weight %, magnesium stearate 0.1-2 weight %, dyeing property enhancer 0.2-3.0 weight %, antioxidant 0.5-3.5 weight %.

Each step is described in detail hereinafter. According to the preparation method of polyurethaneurea elastic fiber having improved chlorine-resistance and heat-resistance of the present invention, the $1^{st}$ polymer having 2.4-3.5 mol % of non-reacted diisocyanate at terminal was first obtained by adding diphenylmethane-4,4'-diisocyanate(p,p'-methylene-diphenyldiisocyanate) and polytetramethylene etherglycol stepwise in a cylindrical pipe reactor. The polymer was cooled down at 40° C. Before loading the $1^{st}$ polymer in the second polymerization reactor, it was completely dissolved in N,N-dimethylacetamide using high shear mixer to reduce non-reacted diisocyanate. In this invention, it was confirmed that when mono-alcohol was not used, the regulation of reaction speed of the first polymerization and the improvement of regularity of the polymer and physical properties were all excellent. If mono-alcohol is used, the terminal group of the $1^{st}$ polymer is blocked with urethane group, which might favors securing stability of viscosity during the second polymerization but molecular weight might decrease and physical properties of yarn decrease because of weaker molecular bindings, compared with when urea group is generated by a chain extender or a chain terminator. Instead of using mono-alcohol, count current static mixer was used to regulate the reaction speed and to mix the polymer evenly. Irregular reaction of the first polymer was minimized by using 35-45° C., preferably 40° C., static mixer with regulating the reaction speed. The temperature of the reactor was raised stepwise from 40° C. to 70-95° C., more preferably 85-95° C., to regulate the reaction speed. The combination of the above said processes resulted in the improvement of heat-resistance and chlorine-resistance. In this invention, regularity of reactant was much improved by using count current static mixer, indicating that regularity of physical properties was achieved. It was also confirmed in this invention even if a chain extender was used alone instead of mono-alcohol, elastic polymer having excellent physical properties could be prepared.

The mixture was loaded in the second polymerization reactor together with a chain extender solution (N,N-dimethylacetateamide solution containing ethylenediamine dissolved therein), a chain terminator solution (N,N-dimethylacetateamide solution containing diethylamine dissolved therein) and a cross-linking agent (diethyltriamine), followed by the second reaction with high speed stirring to give polyurethaneurea polymer at 60~95° C. The contents of the chain extender and the chain terminator amine was 1-6 equivalent % to isocyanate group included in the $1^{st}$ polymer, which favors inhibition of gel formation and securing viscosity stability. The remaining non-reacted group of the chain terminator amine at terminal of the second polymer is used for the amine exchange reaction between the chain terminator at the polymer terminal and the non-reacted chain extender during high temperature spinning at 250° C., resulting in the increase of molecular weight of the secondary polymer.

More particularly, ethylenediamine was used alone as the chain extender, and the content of the chain terminator was 1/10~1/30 by the amine equivalent of the chain extender, more preferably 1/15 by the amine equivalent. As the cross-linking agent and the viscosity stabilizer, diethylenetriamine was added to the $1^{st}$ polymerization mixture by 50-500 ppm, and more preferably 150 ppm. In this invention, 1,2-propylenediamine was not used as a mixed chain extender. Instead, ethylenediamine having better reactivity was used as a single chain extender. At this time, in order to regulate reaction speed and to inhibit sub-reactions, the content of the chain terminator had to be increased from the content added when a mixed chain extender was used, which was 1/20-1/25 equivalent. If the ratio of the chain terminator to the chain extender is less than 1/20 equivalent, molecular weight of a polymer increases excessively with excessively increasing viscosity. If the content of diethylenetriamine used as the viscosity stabilizer is up to 50 ppm, viscosity stability of dope might be damaged and cross-linking reaction during spinning is reduced, so that improvement effect on heat-resistance is not expected. On the contrary, if the content of diethylenetriamine is at least 500 ppm, the increasing speed of viscosity becomes slow, suggesting that it takes long time to obtain the target viscosity, and gel formation and irregularity of polymer increase owing to the excessive cross-linking, resulting in poor spinning property.

The content of amine added to the second polymerization was regulated to make the content of terminal amine group of the final polymer to be 5-30 meq/kg. The stirring speed of the second polymerization reactor was regulated to make the reaction efficiency of the $1^{st}$ polymer and amine to be at least 80%. Stirring efficiency at the exit of the second polymerization reactor was measured to determine a proper stirring speed for the reaction. The polyurethaneurea polymer synthesized by chain extension and chain termination contained approximately 30-40% solid and has apparent viscosity of 1000-2500 poise at 40° C., by which the $2^{nd}$ polymer solution was obtained. Intrinsic viscosity of the polymer at the concentration of 0.5 g per 100 ml of N,N-dimethylacetamide solution was approximately 1.0.

In this invention, basic magnesium carbonate was added to the $2^{nd}$ polymer composition by 0.1-10 weight % to give chlorine-resistance. At this time, the basic magnesium carbonate is preferably coated with one or more compounds selected from the group consisting of fatty acid, fatty acid metal salt, fatty acid ester, fatty acid phosphoester, silica, silane, polyorganosiloxan and polyorganosiloxan/polyorganohydrogensiloxan mixture. The content of such coating agent is 1-20 weight part by 100 weight part of basic magnesium carbonate.

$$4MgCO_3Mg(OH)_2 4H_2O \qquad \text{formula 1}$$

$$3MgCO_3Mg(OH)_2 3H_2O \qquad \text{formula 2}$$

$$4MgCO_3Mg(OH)_2 \qquad \text{formula 3}$$

$$3MgCO_3Mg(OH)_2 \qquad \text{formula 4}$$

$$MgCO_3 \qquad \text{formula 5}$$

The basic magnesium carbonate used in this invention was partially coated with an acidic or neutral coating agent to reduce basic property of a material and plus charge of the surface and at the same time to reduce moisture absorption. As a result, re-coagulation of the material was inhibited, suggesting that spinning property of dope was increased, and at the same time, coloring and color changes of fabric after spinning were inhibited.

The coating agent herein can be selected from the group consisting of higher fatty acid such as stearic acid, oleic acid, palmitic acid, and lauric acid and alkali metal salt, higher alcohol, and ester thereof, silane, polyorganosiloxan and polyorganosiloxan/polyorganohydrogensiloxan mixture. Particularly, the alkali metal salt of higher fatty acid is exemplified by sodium stearate, magnesium stearate, calcium stearate, sodium oleate, sodium palmitate, sodium laurate, and sodium laurylsulfonate. In addition, such higher alcohol as stearyl alcohol, oleyl alcohol, and lauryl alcohol can also be used. The fatty acid ester herein is exemplified by glycerylmonostearate, stearyloleate, and lauryloleate. The fatty acid phosphoester is exemplified by stearic acid phosphate, oleic acid phosphate, lauric acid phosphate, tridecylic acid phosphate, and butyric acid phosphate having C4-C30 straight or branched alkyl group. Calcium silicate (Water Glass 3, DC Chemical Co., Ltd.) was used as the silica herein and the compound represented by chemical formula $(R'O)_3SiR''$ ($R'R''$ is same or different C1-C40 aliphatic or aromatic hydrocarbon) was used as the silane herein. Polydimethylsiloxan was used as the polyorganosiloxan and polydimethylhydrogensiloxan was used as the polyorganohydrogensiloxan herein.

The coated basic magnesium carbonate is added 0.1-10 weight % by the whole dope. If the content is less than 0.1 weight %, chlorine-resistance is not satisfactory. If the content is higher than 10 weight %, satisfactory chlorine-resistance can be obtained but other mechanical properties of yarn such as strength, elasticity and modulus will be decreased.

To add basic magnesium carbonate in the dope solution, it is dispersed in N,N-dimethylacetamide solvent and then pulverized by using wet ball-mill to up to 40 μm, more preferably up to 10 μm, and then dispersed.

If necessary, one or more additive compositions selected from the group consisting of titanium dioxide, waste gas stabilizer, antioxidant, magnesium stearate, dyeing property enhancer, UV stabilizer, and fluorescent brightener can be added in addition to the said anti-chlorine additive.

Particularly, the titanium dioxide acts as a non-glossing agent and can be preferably added 0.05-4.5 weight % to the dope solution for spinning. If the content is less than 0.05 weight %, yarn will be too much sparkling. If the content is more than 4.5 weight %, this over-dose of titanium dioxide accelerates wear of machines during the spinning and knitting.

The waste gas stabilizer plays a role in inhibiting browning by nitrogen oxide. For example, 1,1,1',1'-tetramethyl-4,4'-(methylene-di-p-phenylene)disemicarbazide can be used. The preferable content thereof in the dope solution is 0.2-3.5 weight %. If the content is less than 0.2 weight %, it will not be as effective as expected. On the contrary, if the content is higher than 3.5 weight %, the effect is not so much increased as the content increases.

The antioxidant captures radicals involved in decomposition of polymer by heat or sunlight, which is exemplified by 1,3,5-tris(4-t-butyl-3-hydroxy-2,6-dimethylbenzene)-1,3,5-triazin-2,4,6-(1H,3H,5H)-trion. The content of such antioxidant in the dope solution is 0.5-3.5 weight %. If the content is less than 0.5 weight %, anti-oxidative effect is in question. On the contrary, if the content is higher than 3.5 weight %, the effect is not so much increased as the content increases.

The magnesium stearate is used to improve spinning property and unwinding property of polymer and at the same time to reduce viscosity. The preferable content thereof in the dope solution is 0.1-2 weight %. If the content is less than 0.1 weight %, spinning property and unwinding property are poor. If the content is higher than 2 weight %, the yarn becomes too slippery, resulting in poor packaging. So, the content is preferably regulated in the above range.

The dyeing property enhancer herein is poly(N,N-diethyl-2-aminoethyl methacrylate). The preferable content thereof in the dope solution is 0.2-3.0 weight %. If the content is less than 0.2 weight %, fabric cannot be dyed fully, resulting in sparkling of spandex. If the content is more than 3.0 weight %, the production costs increase and poor dyeing is resulted by the efflux of oligomer during dyeing process. So, the content is preferably regulated in the said range.

To prepare the additive composition of the present invention, an additive was mixed with the solvent DMAc, resulting in the additive slurry having the solid content of up to 40 weight %. Then the slurry was pulverized using high performance wet ball-mill, and then dispersed to prepare solid particles of up to 15 μm. The dope was added to the prepared additive slurry to make the additive slurry having the solid content of 35 weight %, which was added to the $2^{nd}$ polymer to prepare dope for spinning. The prepared dope for spinning proceeded to dry spinning to give polyurethaneurea elastic fiber having high heat-resistance and excellent chlorine-resistance. At this time, loading temperature of spinning nozzle was 250~270° C. and spinning speed was 700~1200 m/min.

The polyurethaneurea elastic fiber prepared by the method of the present invention is also included in the criteria of the invention.

Hereinafter, the preparation method of the present invention is described in detail.

Polytetramethyleneetherglycol (PTMEG, molecular weight: 1815) and phosphoric acid were mixed by 7 ppm by the weight of PTMEG, to which diphenylmethane-4,4'-diisocyanate (MDI) was added (NCO/OH=1.70), followed by polymerization. As a result, the $1^{st}$ polymer containing 2.64 mol % of non-reacted diisocyanate at terminal was prepared. After filtering the $1^{st}$ polymer with a filter (≤20 μm), the polymer was completely and evenly dissolved in N,N-dimethylacetamide (DMAc) in high performance dissolving machine to reduce non-reacted diisocyanate. As a result, the $1^{st}$ polymerization mixture was prepared. Ethylenediamine alone was used as a chain extender and diethylamine was used as a chain terminator. Diethylenetriamine, as a viscosity stabilizer and a cross-linking agent, was dissolved in N,N-dimethylacetamide, in which equivalent ratio of amine/isocyanate was regulated as 1.01-1.06. The mixture was loaded in the second polymerization reactor together with the $1^{st}$ polymerization mixture to give the $2^{nd}$ polymer (35 weight %) having intrinsic viscosity of 1.0, indicating the viscosity measured at 40° C. was 1000-2500 poise. The $2^{nd}$ polymer was mixed with the slurry having 35 weight % of solid content composed of titanium dioxide, 1,1,1',1'-tetramethyl-4,4'(methylene-di-p-phenylene) disemicarbazide, 1,3,5-tris(4-t-butyl-3-hydroxy-2,6-dimethylbenzene)-1,3,5-triazine-2,4,6-(1H,3H,5H)-trion, magnesium stearate, poly(N,N-diethyl-2-aminoethyl methacrylate), ultramarineblue and N,N-dimethylacetamide solvent. At this time, before loading to the process, the slurry was pulverized by using wet ball-mill to make the inorganic additive particle size to be up to 20 μm, followed by dispersion. The dope for spinning was loaded in pipe shaped stationary phase mixer where the additive slurry and the $2^{nd}$ polymerization polymer were mixed evenly. The dope was spun by wet spinning at the spinning speed of 700-1200 m/min to give chlorine-resistant polyurethaneurea elastic fiber. After spinning, the amount of remaining solvent in spandex yarn was regulated to be up to 1.0 weight %. Intrinsic viscosity of the prepared spandex yarn was 1.50 when measured at the concentration of 0.5 g per 100 ml of N,N-dimethylacetamide solution.

The high heat-resistant and chlorine-resistant polyurethaneurea fiber prepared by the above method has excellent regularity and spinning property, so that it can be effectively used for the production of fabric having high quality such as excellent post-dyeing elasticity recovering rate, strength retaining rate and chlorine-resistance.

Advantageous Effect

The polyurethaneurea elastic fiber prepared by the above method was confirmed to have excellent heat-resistance and chlorine-resistance. Particularly, elasticity of the fabric was still excellent after re-dyeing or third staining, suggesting that this fiber could provide high quality fabric having excellent dimensional stability.

The polyurethaneurea elastic fiber prepared by the preparation method of the present invention was confirmed to be excellent polyurethaneurea elastic fiber having excellent multiple properties which had fracture strength (g/d) of 1.0-1.5, elongation break of 500-650%, elasticity recovering rate at 180° C. dry heat of 40-50% and strength retaining rate at dry heat of 82-99%. Strength retaining rates after 24 hours and 48 hours from the treatment of chlorine were respectively 85-98% and 82-95%. Color of yarn (b) was 1.0-3.2.

BEST MODE

Evaluation methods for physical properties are described hereinafter before describing preferred embodiments of the present invention.

1) Measurement of viscosity of polymer

Viscosity of the polymer finished with chain extension and chain termination was measured at 40° C. with Brookfield Viscometer B type, and the result was presented by poise unit.

2) Measurement of stirring efficiency of polymer

Polymer was taken from the exit of the second polymerization reactor, which was dissolved in N,N-dimethylacetamide solution, followed by titration with 0.1N HCl to measure the content of amine at the polymer terminal and dope. Stirring efficiency of the reactor was calculated by percentage of the terminal amine.

3) Measurement of intrinsic viscosity

Viscosity of 100 ml N,N-dimethylacetamide solution containing 0.5 g of polymer was measured in a 30±0.5° C. bath using Ubbelohde viscometer to measure intrinsic viscosity of the polymer.

4) Measurement of pH of anti-chlorine material 2 g of sample was dispersed in 25 ml of ethyl alcohol, and then pH of the material was measured with pH meter.

5) Measurement of fracture strength and elongation break

A sample was extended to 5 cm at the speed of 50 cm/min at 25° C., 65% RH by tension tester (Instrong, UTM) and fracture strength (g/d) and elongation break (%) were measured.

6) Elasticity recovering rate 10 cm length was marked in a sample which was then 300% extended. 24 hours later, the extension was terminated and the recovered length was measured for 10 minutes.

$$ER(\%)=[(Ls-La)/(Ls-Lo)]\times 100$$

(Wherein, Lo is length of marked sample, Ls is sample length of 300% extension, and La is sample length without extension)

7) Wet heat elasticity recovering rate 10 cm length was marked in a sample which was 100% extended, which was treated in the presence of 130° C. vapor for 60 minutes. Extension was terminated and the recovered length (Lw) was measured and compared with that of the non-treated sample. The comparison was presented by ratio. As elasticity recovering rate was high, heat-resistance was also high but heat settability was low.

Wet heat elasticity recovering rate=$[(20-Lw)/10]\times 100$

8) Dry heat strength retaining rate

A sample was treated with 180° C. hot air for one minute as 100% extended, followed by measurement of strength using tension tester. The ratio of the strength after the dry-heat treatment to the strength of non-treated fiber was determined as strength retaining rate and as the retaining rate was high, heat-resistance was also high.

9) Chlorine-resistance of yarn

A 50% extended sample was soaked in a bath containing chlorine (pH 7, available chlorine concentration: 20 ppm) as extended. 24 hours and 48 hours later, the strength ratio was measured and determined as strength retaining rate. Chlorine-resistance was increased as the retaining rate went high. Length of the sample was measured before and after chlorine treatment to measure elasticity recovering rate. Chlorine-resistance was increased as the recovering rate went high (standard of chlorine-resistance of yarn: strength retaining rate 48 hours after the treatment: at least 70%).

10) Chlorine-resistance of fabric

A sample fabric was cut in the direction of wrap by 20 cm×2 cm. It was 50% extended. The sample was soaked in a 25° C. bath containing chlorine (pH 7, available chlorine concentration: 200 ppm) as extended. 50% extension strength ratio over the time was measured and determined as strength retaining rate. Chlorine-resistance was increased as the retaining rate went high.

11) Measurement of heat-resistance of yarn

Heat-resistance of polyurethaneurea yarn and fabric sample was measured by Dynamic Mechanical Analysis (Q800 V7.1 BUILD 116, TA INSTRUMENT). The sample was investigated by tension way under the conditions of 10 μm amplitude, 100 Hz frequency, and 5° C./min temperature increasing speed. The temperature where drastic change of length was observed was determined as setting point of losing elasticity. According to the temperature of the setting point, heat-resistance of yarn and fabric was judged.

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLE 1

305.80 g of polytetramethyleneetherglycol (molecular weight: 1815) and phosphoric acid (molecular weight: 98.0, 7 ppm by the weight of polytetramethyleneetherglycol) were mixed. 72.72 g of diphenylmethane-4,4'-diisocyanate was loaded to 40° C. static mixer using metering pump and mixed with the mixture, which was loaded in a 80° C. cylindrical pipe shaped continuous polymerization tube, followed by reaction for 135 minutes. The reaction was regulated to make the content of non-reacted diisocyanate to be 2.64 mol % at terminal. As a result, the $1^{st}$ polymer having viscosity of 620 poise was synthesized.

The $1^{st}$ polymer was cooled down to 40° C., followed by stabilization within 24 hours. Before loading the polymer into the second reactor, the polymer was loaded continuously in high shear mixer together with 608.78 g of N,N-dimethylacetamide, followed by stirring vigorously for 20 seconds at 3500 rpm. The $1^{st}$ polymer was completely dissolved and cooled down to 40° C. to give polyurethane prepolymer mixture having the solid content of 45%.

The mixture was loaded in the second polymerization reactor together with chain extender solution (ethylenediamine 6.82 g) and chain terminator solution (diethylamine 1.24 g) and diethylenetriamine (180 ppm), followed by stirring at 185 rpm for approximately 4 minutes to induce second polymerization at 80° C. As a result, polyurethaneurea compound was obtained.

The amount of diethylamine added thereto was 1/14.4 (amine equivalent ratio) by chain extender solution. The amount of amine was determined by which amine equivalent reached 4 equivalent % by isocyanate group in the prepolymer. Polymerization was terminated when non-reacted amine content was lowered under 3 mol %.

The polyurethaneurea $2^{nd}$ polymer polymerized by the chain extender and chain terminator contained approximately 35% of solid and apparent viscosity thereof was approximately 2000 poise at 40° C. Intrinsic viscosity of the polymer measured at the concentration of 0.5 g in 100 ml of N,N-dimethylacetamide solution was 1.0.

To maintain durability and white color during washing and use and to improve color change resistance (preventing browning) and dyeing property and to prevent mechanical property damage and to improve chlorine-resistance, titanium dioxide 0.50 weight %, 1,1,1',1'-tetramethyl-4,4'(methylene-di-p-phenylene) disemicarbazide (waste gas stabilizer HN-150, Hydrazine, Japan) 0.50 weight %, and 1,3,5-tris(4-t-butyl-3-hydroxy-2,6-dimethylbenzene)-1,3,5-triazin-2,4,6-(1H,3H,5H)-trion (hindered phenol compound) CYANOX 1790 (antioxidant, Cynamid, USA) 1.44 weight % were added to the polymerized solution. Magnesium stearate (Nippon Oil & Fats Co., Japan) 0.30 weight % and poly(N,N-diethyl-2-aminoethyl methacrylate (dyeing property enhancer) 0.51 weight % were added to improve viscosity and unwinding property. Ultramarineblue (UMB) 30 ppm was added to increase color expression of yarn. Hydromagnesite (Airlite-S1, Nanotech) coated with stearic acid 3 weight part by the anti-chlorine material was also added as an anti-chlorine additive by 4.0 weight %. When the additive slurry was prepared, the inorganic particle size was regulated as up to 10 μm by pulverization and dispersion using dry and wet ball-mill. Inorganic additives in the additive slurry were pulverized by using ball-mill until the mean diameter of the inorganic substance reached up to 10 μm, which then proceeded to the processing. At this time, it was important to mix the final polymer and the additives evenly. So, cylindrical pipe type static mixer was used for the even mixing. The polyurethaneurea product prepared above contained approximately 35% of solid and had viscosity of 6300 poise (40° C.) which was the appropriate viscosity for spinning.

The temperature of the additive slurry to be mixed with the final polymer was maintained at 45° C. The prepared polymer solution for spinning was pushed in spinning tank regularly by using a gear pump at 250° C., followed by dry spinning evaporating solvent. As a result, polyurethane elastic fiber having 40 denier/3 filaments was prepared at the spinning speed of 900 m/min. The physical properties of the fiber are shown in Table 2.

EXAMPLE 2

The elastic fiber was prepared by the same manner as described in Example 1 except that 90 ppm of diethyltriamine was used as a viscosity stabilizer and cross-linking agent.

EXAMPLE 3

The elastic fiber was prepared by the same manner as described in Example 1 except that diethylamine was added 1/14 (amine equivalent ratio) by chain extender (ethylenediamine) solution and 230 ppm of diethylenetriamine was used as a viscosity stabilizer and cross-linking agent.

EXAMPLE 4

The elastic fiber was prepared by the same manner as described in Example 1 except that hydromagnesite used as an anti-chlorine agent was not added.

EXAMPLE 5

The elastic fiber was prepared by the same manner as described in Example 3 except that hydromagnesite used as an anti-chlorine agent was not added.

COMPARATIVE EXAMPLE 1

Polytetramethyleneetherglycol (molecular weight: 1,800) and 4,4'-diphenylmethane diisocyanate were mixed at the molar ratio of 1.62. Reaction was induced at 15° C. without normal butanol, followed by stirring at 65° C. for 100 minutes. As a result, polyurethane prepolymer having isocyanate group at the terminal was obtained. The prepared prepolymer was cooled down to 30° C., to which dimethylacetamide was added, resulting in polyurethane prepolymer solution containing 45% solid.

Equivalent % of ethylenediamine and diethylamine in the prepolymer solution was 1/16.7. The prepared prepolymer solution was loaded in high shear mixer (stirring speed: 2,500 rpm), following by reactions of chain extension and chain termination. As a result, polyurethaneurea polymer solution (conc.: 33%, temp.: 30° C., viscosity: 4500 poise) was obtained.

To the prepared polymer solution were added additives such as titanium dioxide, antioxidant, anti-browning agent, dyeing property enhancer, and spinning property enhancer, followed by removing bubbles, resulting in spinning solution having the polymer concentration of 32%. Dry spinning was performed at the spinning speed of 700 m/min, at the spinning nozzle loading temperature of 250° C. to give 40 denier/3 filaments polyurethaneurea elastic fiber.

COMPARATIVE EXAMPLE 2

The elastic fiber was prepared by the same manner as described in Example 1 except that normal butanol (n-butanol) was added to polytetramethyleneetherglycol by 1200 ppm and the amount of diethylamine was 1/26 (amine equivalent ratio) of chain extender solution and 1500 ppm of diethylenetriamine was used as a viscosity stabilizer and cross-linking agent.

COMPARATIVE EXAMPLE 3

1200 ppm of normal butanol (n-butanol, molecular weight: 74.72) and 7 ppm of phosphoric acid were added to polytetramethyleneetherglycol and mixed. Diphenylmethane-4,4'-diisocyanate was loaded to 45° C. static mixer using metering pump and mixed with the mixture, which was loaded in a 90° C. cylindrical pipe shaped continuous polymerization tube, followed by reaction for 130 minutes. The reaction was regulated to make the content of non-reacted diisocyanate to be 2.64 mol %, at terminal. As a result, the $1^{st}$ polymer having viscosity of 620 poise was synthesized.

The mixture was loaded in the second polymerization reactor together with chain extender solution (ethylenediamine/1,2-diaminopropane=molar ratio 80/20) and chain terminator solution (diethylamine), followed by the second polymerization for 4 minutes with stirring at 200 rpm. As a result, 70° C. polyurethaneurea compound was obtained. The elastic fiber was prepared by the same manner as described in Comparative Example 1 except that the amount of diethylamine was 1/20 (amine equivalent ratio) of chain extender (ethylenediamine) solution.

TABLE 1

Compositions and characteristics of Examples and Comparative Examples

| | Chain extender/ Chain terminator | Butanol | DETA | Hydro-magnesite | Concentration of Solid content | Concentration before adding Additive | 30 hour | 50 hour | 60 hour |
|---|---|---|---|---|---|---|---|---|---|
| Example1 | diethylamine/ ethylenediamine = 1/14.4 | 0 ppm | 180 ppm | 4% | 35% | 2300 | 4200 | 5400 | 6300 |
| Example2 | diethylamine/ ethylenediamine = 1/14.4 | 0 ppm | 90 ppm | 4% | 35% | 2500 | 5000 | 7700 | x |
| Example3 | diethylamine/ ethylenediamine = 1/14.0 | 0 ppm | 230 ppm | 4% | 35% | 1850 | 3000 | 4300 | X |

TABLE 1-continued

Compositions and characteristics of Examples and Comparative Examples

| | Chain extender/ Chain terminator | Butanol | DETA | Hydro-magnesite | Concentration of Solid content | Concentration before adding Additive | 30 hour | 50 hour | 60 hour |
|---|---|---|---|---|---|---|---|---|---|
| Example4 | diethylamine/ ethylenediamine = 1/14.4 | 0 ppm | 180 ppm | 0% | 35% | 2300 | 5000 | X | X |
| Example5 | diethylamine/ ethylenediamine = 1/14.0 | 0 ppm | 230 ppm | 0% | 35% | 1800 | 4500 | X | X |
| Comparative example1 | diethylamine/ ethylenediamine = 1/16.7 | 0 ppm | 0 ppm | 0% | 33% | 6000 | 5000 | 4800 | 5600 |
| Comparative example2 | (diethylamine/1.2-Propylenediamine)/ ethylenediamine = 1/26.0 | 1200 ppm | 150 ppm | 4% | 35% | 2500 | 3450 | 4500 | X |
| Comparative example3 | (diethylamine/1.2-Propylenediamine)/ ethylenediamine = 1/20.0 | 1200 ppm | 0 ppm | 0% | 37% | 2500 | 3500 | 4500 | X |

TABLE 2

Characteristics of Examples and Comparative Examples

| | Yarn property | | Heat resistance | | | Chlorine resistanace | | Color |
|---|---|---|---|---|---|---|---|---|
| | fracture strength (g/d) | elongation Break (%) | elasticity recovering rate at 180° C. dry heat (%) | strength retaining rate at 180° C. dry heat (%) | DMA setting point (° C.) | strength retaining rates after 24 hours | strength retaining rates after 48 hours | of Yarn (b) |
| Example1 | 1.30 | 580 | 45 | 94 | 192 | 95 | 91 | 1.5~2.5 |
| Example2 | 1.25 | 590 | 44 | 94 | 195 | 93 | 88 | 1.5~2.5 |
| Example3 | 1.35 | 600 | 43 | 92 | 193 | 92 | 89 | 1.5~2.5 |
| Example4 | 1.35 | 595 | 47 | 98 | 191 | 70 | 45 | 1.5~2.5 |
| Example5 | 1.20 | 610 | 46 | 97 | 192 | 50 | cut | 1.5~2.5 |
| Comparative Example1 | 0.90 | 610 | 47 | 98 | 194 | 45 | cut | 4.0~4.5 |
| Comparative Example2 | 1.35 | 580 | 43 | 80 | 185 | 95 | 90 | 3.5~4.0 |
| Comparative Example3 | 1.40 | 570 | 40 | 65 | 183 | 40 | cut | 3.5~4.0 |

As explained in Examples and Comparative Examples hereinbefore, the elastic fiber prepared by the method of the present invention demonstrates excellent heat-resistance and chlorine-resistance and thus the method of the present invention can overcome problems of the conventional method such as unsatisfactory heat-resistance and chlorine-resistance.

The fiber of the present invention has more improved chlorine-resistance by using hydromagnesite coated with fatty acid and improved heat-resistance by using ethylenediamine alone as a chain extender of polymer, compared with the fibers prepared in Comparative Examples of the invention using the conventional 1,2-propylenediamine mixed chain extender.

That is, the polyurethaneurea elastic fiber of the present invention prepared by continuous polymerization using hydromagnesite coated with fatty acid and ethylenediamine alone as a chain extender has excellent heat-resistance and chlorine-resistance as well as elasticity recovering rate and dimensional stability after knitting and dyeing. So, the fabric prepared from the elastic fiber can have excellent fabric color and high quality.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A method of preparing polyurethaneurea elastic fiber having heat-resistance and chlorine-resistance comprising the steps of:
   (a) preparing a first polyurethane polymer by mixing polyol and isocyanate compound in the absence of mono-alcohol;
   (b) preparing a second polymer by adding a chain extender, a chain terminator, and a cross-linking agent to the first polymer of step (a), and at this time, using ethylenediamine alone as a chain extender;
   (c) preparing a spinning dope by adding a surface modified basic magnesium carbonate as an anti-chlorine additive to the second polymer of step (b); and (d) preparing the elastic fiber by spinning the spinning dope of step (c), wherein the first polymer of step (a) is prepared by mixing the polyol and isocyanate compound continuously loaded in a count current static mixer, wherein the polyurethaneurea elastic fiber has fracture strength (g/d) of 1.0-1.5, elongation break of 450-700%, elasticity recovering rate at 180° C. dry heat of 40-50%, and color of yarn (b) of 1.0-3.2, and wherein a strength of the fiber after treatment with 180° C. hot air for 1 minute as 100% extended is 82-99% of a strength of a non-treated fiber and a strength of the fiber after 24 hours and 48 hours of soaking in a bath containing 20 ppm of chlorine and having a pH of 7 at an extension of 50% is, respectively, 85-98% and 82-95% of a strength of a non-treated fiber.

2. The method of claim 1, wherein the first polymer of step (a) is prepared by mixing polytetramethyleneetherglycol with 3-20 ppm of phosphoric acid, which was further mixed with diphenylmethane-4,4'-diisocyanate to meet the equivalent to polytetramethyleneetherglycol (NCO/OH) of 1.5-2.0, and wherein the first polymer prepared thereby contains 2.4-3.5 mol % of isocyanate at the end group and has a viscosity of 500-700 poise.

3. The method of claim 2, wherein the second polymer of step (b) is prepared by adding a chain extender solution and a chain terminator solution and a cross-linking agent to the first polymer and stirring thereof, and wherein the second polymer prepared thereby contains 35% solid content at 40° C. and has an apparent viscosity of 1000-2500 poise.

4. The method of claim 3, wherein the chain extender and the chain terminator of step (b) is added by 1-6 equivalent % excess to the isocyanate end group of the first polymer.

5. The method of claim 4, wherein the surface modified basic magnesium carbonate of step (c) is coated with one or more coating agents selected from the group consisting of fatty acid, fatty acid metal salt, fatty acid ester, fatty acid phosphoester, silica, silane, polyorganosiloxan and polyorganosiloxan/polyorganohydrogensiloxan mixture, and wherein the surface modified basic magnesium carbonate content in the spinning dope solution is 0.1-10 weight % and the spinning dope has a viscosity of 3500-7000 poise (40° C., 35% solid content).

6. The method of claim 5, wherein the coating agent is used for coating an amount of 1-20 parts by weight based on the basic magnesium carbonate.

7. The method of claim 1, wherein the basic magnesium carbonate of step (c) is one or more compounds selected from the group consisting of $4MgCO_3Mg(OH)_2 4H_2O$, $3MgCO_3Mg(OH)_2 3H_2O$, $4MgCO_3Mg(OH)_2$, $3MgCO_3Mg(OH)_2$, and $MgCO_3$.

8. The method of claim 3, wherein in step (b), the chain terminator is diethylamine, the chain extender and the chain terminator are dissolved in N,N-dimethylacetamide solution, and the cross-linking agent is diethylenetriamine.

9. The method of claim 4, wherein the chain terminator is used by 1/10-1/30 amine equivalent of the chain extender and diethylenetriamine is added by 50-500 ppm to the first polymerization mixture.

10. The method of claim 1, wherein the first polymer of step (a) is polymerized by loading the components continuously into a count current static mixer by using a metering pump, followed by reaction in a cylindrical pipe type continuous polymerization tube.

11. The method of claim 1, wherein the spinning dope of step (c) additionally contains the anti-chlorine material hydromagnesite and one or more additive compositions selected from the group consisting of titanium dioxide, waste gas stabilizer, magnesium stearate, diethylenetriamine, dyeing property enhancer, and antioxidant.

12. The method of claim 11, wherein the additive compositions added are as follows: 0.05-4.5 weight % titanium dioxide; 0.2-3.5 weight % waste gas stabilizer, 1,1,1',1'-tetramethyl-4,4'(methylene-di-p-phenylene)disemicarbazide; 0.1-2 weight % magnesium stearate; 0.2-3.5 weight % dyeing property enhancer, poly(N,N-diethyl-2-aminoethyl methacrylate); and 0.5-3.5 weight % antioxidant, 1,3,5-tris(4-t-butyl-3-hydroxy-2,6-dimethylbenzene)-1,3,5-triazin-2,4,6-(1H, 3H, 5H)-trion.

13. The method of claim 1, wherein a spinning nozzle loading temperature during the spinning of the spinning dope is 250-270° C., and spinning speed is 700-1200 m/min.

14. The method of claim 13, wherein the mixture for preparing the first polymer is continuously loaded in a 35~45° C. count current static mixer, followed by the secondary reaction in a 70~95° C. cylindrical pipe continuous polymerization tube.

15. A polyurethaneurea elastic fiber having heat-resistance and chlorine-resistance prepared by the method of claim 1.

16. A polyurethaneurea elastic fiber having heat-resistance and chlorine-resistance prepared by the method of claim 13.

17. A polyurethaneurea elastic fiber having heat-resistance and chlorine-resistance prepared by the method of claim 14.

18. A polyurethaneurea elastic fiber having fracture strength (g/d) of 1.0-1.5, elongation break of 450-700%, elasticity recovering rate at 180° C. dry heat of 40-50%, and color of yarn (b) of 1.0-3.2, and wherein a strength of the fiber after treatment with 180° C. hot air for 1 minute as 100% extended is 82-99% of a strength of a non-treated fiber and a strength of the fiber after 24 hours and 48 hours of soaking in a bath containing 20 ppm of chlorine and having a pH of 7 at an extension of 50% is, respectively, 85-98% and 82-95% of a strength of a non-treated fiber.

* * * * *